Figure 1:
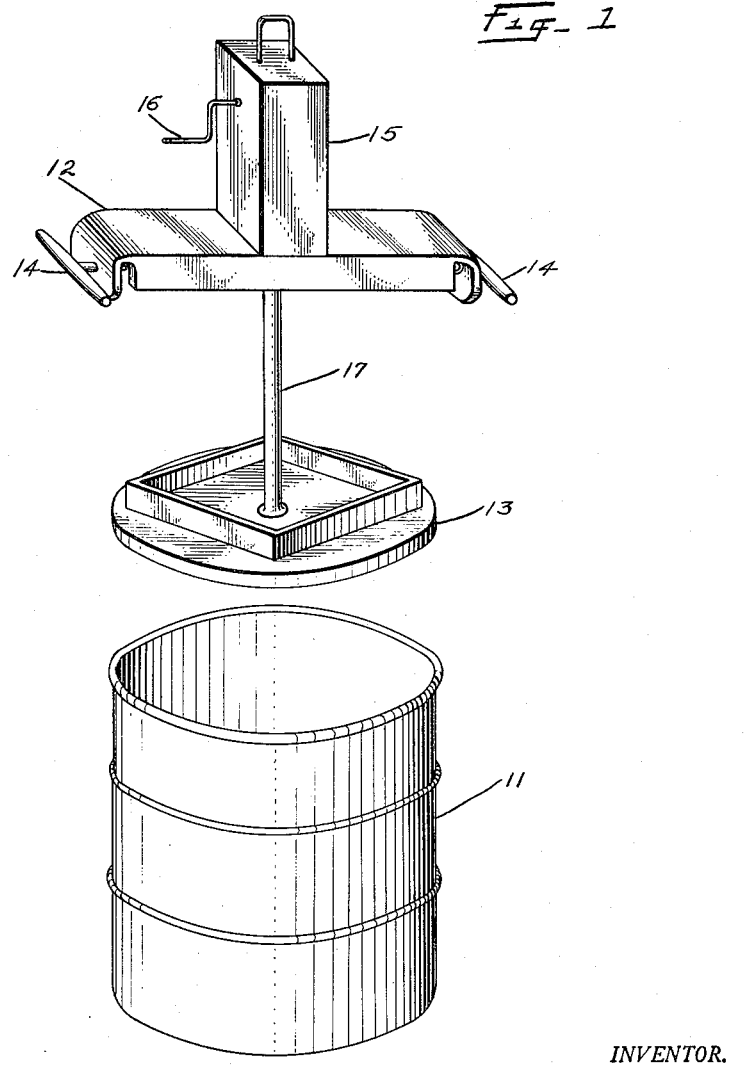

July 23, 1963 M. DUBIL 3,098,747
METHOD FOR PREPARING A GROUND BEEF PRODUCT
Filed March 10, 1960

INVENTOR.
MATTHEW DUBIL
BY
AGENT

United States Patent Office 3,098,747
Patented July 23, 1963

3,098,747
METHOD FOR PREPARING A GROUND BEEF PRODUCT
Matthew Dubil, Parlin, N.J., assignor to Dubil Manufacturing, Inc., Spotswood, Monroe Township, N.J., a corporation of New Jersey
Filed Mar. 10, 1960, Ser. No. 14,062
2 Claims. (Cl. 99—108)

This invention relates to an improved method of processing ground beef and beef trimmings. In particular, this invention relates to a method of processing beef to prepare ground beef products such as hamburger and the like, to improve the color, appearance and keeping qualities thereof.

In the preparation of ground beef products such as hamburger, it is the usual practice, after the carcass has been bled and butchered, to grind beef trimmings or other beef muscle meats in a conventional meat grinder to produce a ground product having a generally uniform appearance and texture.

The initial bleeding of the carcass, and subsequent hanging, do not completely remove all blood from the tissues, and it has been found that if the residual blood is not removed from the ground product, it oxidizes upon exposure to the atmosphere, and assumes a dark color, which masks the natural pink or red color of the tissues and makes the meat product unattractive to the eye. Such residual blood also contributes a flavor to the meat product which, although favored by some consumers, is not esteemed by the majority.

The need for removing residual blood is universally recognized, and steps, heretofore considered adequate for the removal thereof, are universally practiced. In accordance with the usual procedures, the residual blood has been removed by placing the ground meat in a suitable container, such as an 18-inch diameter stainless steel drum (which is currently accepted as standard equipment), covering the top with paper to protect it from contamination, and then piling on top of it as much heavy material as was available or the stamina of the butcher was adequate to cope with. After a suitable period of standing under these conditions (normally from about 35 to 65 hours), the occluded residual blood was squeezed out of the tissues and rose to the top of the container, whence it was poured off. The meat was then passed through the grinder again, and was found to assume a red color. The red color did not, in most cases, darken appreciably on exposure to the atmosphere, and the treatment was therefore considered effective in removing the resdiual blood.

It has now been discovered that this was not entirely true. During the pressing procedure, the meat was not all under the same degree of pressure. That which was on the bottom and directly under the weight applied to the top of the material was under a maximum pressure, and that which was on the top, in the space between the applied weight and the side of the container, was under substantially no pressure. The remainder of the meat was under varying intermediate degrees of pressure. As a result of this situation, whatever residual blood was contained in the meat was urged toward the low-pressure zone, but having arrived there was forced out of the body of the meat only by virtue of the fluid pressure of additional expressed blood behind it. Thus, a substantial portion of the pressed meat remained, despite the pressing operation, completely saturated with blood. This saturated portion of the meat became well mixed with the rest of the batch during subsequent grinding. While, in most cases, it was not sufficient in amount to cause the meat to oxidize to a black, as opposed to a red, color, it nevertheless detracted from the bright red bloom of perfectly processed meat. The effect of this residue of blood has apparently not previuosly been noted, and I have observed it only indirectly. It is conceivable that the remaining blood, being present in relatively small amounts, and being well distributed by the final grinding operation, became fully oxidized during the same period that the tissues were assuming their final red color, so that no subsequent color change was noticeable. At any rate, I have found that when the pressing operation is conducted in such a manner as to preclude the inclusion in the batch of any appreciable quantity of blood-saturated meat, the final product, after aeration (e.g. by the customary final grind) has a very markedly improved color and appearance.

According to this invention therefore, I contemplate a method for preparing a ground beef product which comprises the steps of grinding muscle tissue beef to the consistency of hamburger, confining said ground beef in a zone, said zone being substantially totally enclosed but not fluid-tight, maintaining said beef under a sustained pressure of at least 2 pounds per square inch for at least 15 hours, thereby expressing air and residual blood from said meat and out of said zone, releasing said pressure, breaking up the resulting meat cake and aerating said meat.

This invention also contemplates an apparatus for the processing of beef which comprises in combination a bridging member adapted to lie across the mouth of a drum, clamping means operative to hold said bridging member in fixed position relative to said drum, shaft means extending from said bridging means in the direction of said mouth, said shaft means terminating in a pressure plate, said pressure plate being substantially coextensive with the mouth of said drum, said drum and said plate forming an assembly defining a substantially enclosed space, said assembly being interrupted by aperture sufficient for escape of fluids from a meat product contained in said space, and drive means operative to create relative motion between said drum and said pressure plate in a direction axially of said drum and to maintain a pressure in said direction of at least about 2 pounds per square inch of working area of said pressure plate.

In a particularly desirable embodiment, this invention contemplates an apparatus as aforesaid, in which said drive means comprises a housing mounted on said bridging member and receiving the upper end of said shaft, said housing containing a drive operative to impart longitudinal motion to said shaft, means for actuating said gear drive from outside said housing, and sealing means operative to prevent leakage of lubricant from the bottom of said housing.

Referring now to the figure:

FIGURE 1 is a perspective view of the apparatus of this invention.

In carrying out the process of this invention using the apparatus of FIGURE 1, a suitable quantity of meat, say 250 pounds, is placed in the drum 11, and bridging member 12 is placed across the mouth of the drum, with pressure plate 13 closing the mouth of the drum, and the bridging member is firmly secured to the lip of the drum by means of clamps 14. The drive means, which is contained in housing 15, is then actuated by the use of any appropriate means, for example crank 16, causing the shaft 17 and pressure plate 13 to press down on the meat. Pressure plate 13 fits closely but loosely in the drum, for example having a one-eighth-inch clearance all around. Besides facilitating insertion and movement of the pressure plate, this clearance provides an aperture for escape of expressed blood from the confined space inside the drum. If desired, the necessary aperture may take other forms, such as perforations in the walls or bottom of the drum, or in the pressure plate. In response to the drive means, pressure plate 13 moves down into contact with the meat and exerts a sustained pressure thereon. The residual blood in the meat is thereby squeezed out and escapes through the clearance around the pressure plate, or such other aperture as may be provided. The meat is left under compression for a suitable period of time, for example about 18 to 22 hours, to allow the fluids to work their way out of the mass. The expressed blood is then removed in any convenient manner, for example by laying the drum on its side and allowing the blood to drain off. The pressure is then removed, and the pressed meat, which by now has assumed a pale red or pink color, is withdrawn, broken up and aerated. This is most conveniently done by passing the pressed meat through the grinder, which restores the pressed cake to a loose, uniform texture, and at the same time insures ample contact with the air needed to restore the rich red color of the meat. If desired, the meat may be left under pressure for considerably longer periods of time, or may be stored without pressure for a considerable period of time until needed, and then ground.

Surprisingly, I have found that when ground beef is prepared according to the process of this invention, not only are its color and appearance enhanced, but also its keeping qualities are improved to a very pronounced extent. Thus, ground beef prepared according to conventional methods will stay fresh, even with proper refrigeration, for a maximum of about two days. Ground beef prepared according to the process of my invention, on the other hand, will remain fresh and sweet for as long as ten days under the same conditions. I attribute this improvement to the substantially complete removal of air from the meat. Because of the lower pressures employed and the pressure leakage inherent in the conventional methods, appreciable quantities of air remained trapped within the meat, and contributed to its speedy deterioration.

In the operation of the modern large butcher shop, it is customary to reserve trimmings from the various cuts of beef such as steaks, roasts and the like, in a container provided for the purpose, and subsequently grind them to form part or all of the ground beef used for hamburger. As a practical matter, this sometimes involves difficulties, because the production of these trimmings is greatest during rush periods, for example the usual Saturday rush, when it is impossible to process them. It is necessary to process the trimmings within a short period of time, however, because loose trimmings, even under refrigeration, will spoil in two days' time and be unfit for human consumption.

Using the apparatus of this invention, the trimmings can be readily and rapidly placed under pressure, and held in the form of a pressed cake until it is desired to grind them to hamburger. With proper refrigeration, they may, in fact, be held for as long as seven days before grinding, then ground to hamburger, pressed as previously described, and retained under refrigeration for an additional ten days. Again, the remarkable keeping qualities of the trimmings under these conditions may be attributed to the substantial elimination of air.

The effect on keeping qualities of processing according to this invention is also observable in a remarkable increase in the length of time the reground, aerated hamburger may be left on display in the showcase. In a conventional refrigerated display case, hamburger ordinarily can be displayed for a maximum of five to six hours, after which, if not sold in the meantime, it must be removed from the case and either reprocessed or discarded, because of the undesirable gray color assumed by the meat after this period. Although still fit for use, the meat at this stage is unattractive to the customer. This period may be prolonged somewhat by carefully wrapping the meat in individual packages to protect it from the atmosphere, or the color may be masked by the use of color additives. Neither of these expedients is necessary when the meat is processed according to this invention, because the hamburger, under the same conventional conditions, retains its fresh red color for approximately thirty-six hours without protective wrapping and without artificial color additives.

This invention, therefore, also contemplates a method of utilizing beef which comprises the steps of trimming solid cuts of muscle tissue beef, collecting the trimmings therefrom, retaining said trimmings in a substantially completely enclosed but non-fluid-tight zone under a pressure of at least 2 pounds per square inch until desired to process the same to hamburger, releasing said pressure, grinding said trimmings, confining said ground trimmings in a zone, said zone being substantially totally enclosed but not fluid-tight, maintaining said ground trimmings under a sustained pressure of at least 2 pounds per square inch for at least 15 hours, thereby expressing air and residual blood from said meat and out of said zone, releasing said pressure, breaking up the resulting meat cake and aerating said meat.

Using a conventional 30 gallon stainless steel drum as the receiver for the trimmings or the ground meat, as the case may be, the internal diameter of the drum is 18 inches, and a pressure plate of 17¾ inches diameter will provide a ⅛ inch clearance all around. This amount of clearance, while not sufficient to allow substantial leakage or retention of residual blood in low-pressure zones, is sufficient to provide for escape of fluids—i.e. air and blood. The 30-gallon drum holds approximately 250 pounds of trimmings or of ground meat before compression, and this amount of meat, when compressed under working pressure will be pressed down to a volume of about 22 gallons, corresponding to about 6 to 8 inches vertical travel of the pressure plate. The drive means must therefore be capable of imparting this amount of longitudinal motion to the shaft.

The precise design of the drive means is unimportant, so long as it is capable of providing sustained pressure, and of causing the shaft and pressure plate to travel the required distance (in the example above, about 6 to 8 inches) while doing so. Many methods of bringing about this result will occur to the skilled mechanic. In practice, I prefer to use a drive means in the form of a helical gear integral with or keyed onto the shaft of crank 16, said helical gear being operative to drive a spur gear keyed onto the end of a threaded shaft, said threaded shaft bearing a spiral thread which is threaded through a fixed member having an internal thread, causing the threaded shaft to move up or down when rotated by the crank. The threaded shaft may be an integral portion of shaft 17, and the latter made integral with plate 13, but this arrangement causes the pressure plate 13 to revolve as it moves downward. Preferably, therefore, a suitable thrust bearing is interposed between the threaded shaft and shaft 17, or between shaft 17 and plate 13, to the end that plate 13 is free to move straight down, without rotating. This arrangement is one of many which might be employed to provide the necessary sustained pressure, and is described merely by way of illustration.

While this invention has been described by way of certain preferred embodiments and illustrated by specific examples, these are illustrative only, and the invention is not to be construed as limited, except as set forth in the appended claims.

I claim:

1. A method for preparing a ground beef product which comprises the steps of grinding muscle tissue beef to the consistency of hamburger, confining said ground beef in a zone, said zone being substantially totally enclosed but not fluid-tight, removing air and residual blood by maintaining said beef under a sustained pressure of at least 2 pounds per square inch for at least 15 hours, releasing said pressure, breaking up the resulting meat cake and aerating said meat.

2. A method of utilizing beef which comprises the steps of trimming solid cuts of muscle tissue beef, collecting the trimmings therefrom, retaining said trimmings in a substantially completely enclosed but non-fluid-tight zone under a pressure of at least 2 pounds per square inch until desired to process the same to hamburger, releasing said pressure, grinding said trimmings, confining said trimmings in a zone, said zone being substantially totally enclosed but not fluid tight, removing air and residual blood by maintaining said ground trimmings under a sustained pressure of at least 2 pounds per square inch for at least 15 hours, releasing said pressure, breaking up the resulting meat cake and aerating said meat.

References Cited in the file of this patent

UNITED STATES PATENTS

| | | |
|---|---|---|
| 924,122 | Williams | June 8, 1909 |
| 1,767,054 | Briggs | June 24, 1930 |
| 2,521,579 | Hopkins et al. | Sept. 5, 1950 |
| 2,826,138 | Pexton | Mar. 11, 1958 |